United States Patent [19]

Ikenoue et al.

[11] Patent Number: 4,933,772
[45] Date of Patent: Jun. 12, 1990

[54] ELECTROPHOTOGRAPHIC PRINTER WITH IMPROVED TIMING ARRANGEMENTS

[75] Inventors: Yoshikazu Ikenoue, Toyokawa, Japan; Kiyoshi Emori, Fortlee, N.J.

[73] Assignee: Minolta Camera Kabushiki Kaisha, Osaka, Japan

[21] Appl. No.: 290,867

[22] Filed: Dec. 27, 1988

Related U.S. Application Data

[63] Continuation of Ser. No. 915,806, Oct. 6, 1986, abandoned.

[30] Foreign Application Priority Data

| Oct. 7, 1985 | [JP] | Japan | 60-224259 |
| Oct. 7, 1985 | [JP] | Japan | 60-224260 |
| Oct. 7, 1985 | [JP] | Japan | 60-224261 |
| Oct. 7, 1985 | [JP] | Japan | 60-224262 |

[51] Int. Cl.$^5$ ............................................. H04N 1/23
[52] U.S. Cl. ..................................... 358/300; 358/434
[58] Field of Search ........................ 358/296, 300, 257

[56] References Cited

U.S. PATENT DOCUMENTS

| 3,889,057 | 6/1975 | Perreault et al. | 358/300 X |
| 4,275,968 | 6/1981 | Irwin | 358/296 X |
| 4,302,782 | 11/1981 | Gunning et al. | 358/296 |
| 4,413,285 | 11/1983 | Anzai et al. | 358/257 X |
| 4,769,648 | 9/1988 | Kishino et al. | |

FOREIGN PATENT DOCUMENTS

| 59-178871 | 10/1984 | Japan . |
| 60-48358 | 3/1985 | Japan . |

Primary Examiner—Clifford C. Shaw
Attorney, Agent, or Firm—Price, Gess & Ubell

[57] ABSTRACT

An improved photographic printer having a source of light such as a laser can produce printed copies from a photoconductive surface. Data representative of the images to be printed can be transformed into intermediate codes which are stored for driving a print controller. A timer can set a predetermined time depending on the length of the paper for the data transformation into the intermediate codes and various elements in the printer can be activated prior to the completion of the transformation, including forwarding copying paper to a predetermined position adjacent the photoconductive surface whereby excessive wear of the printer is prevented and an increased printing speed is achieved.

18 Claims, 13 Drawing Sheets

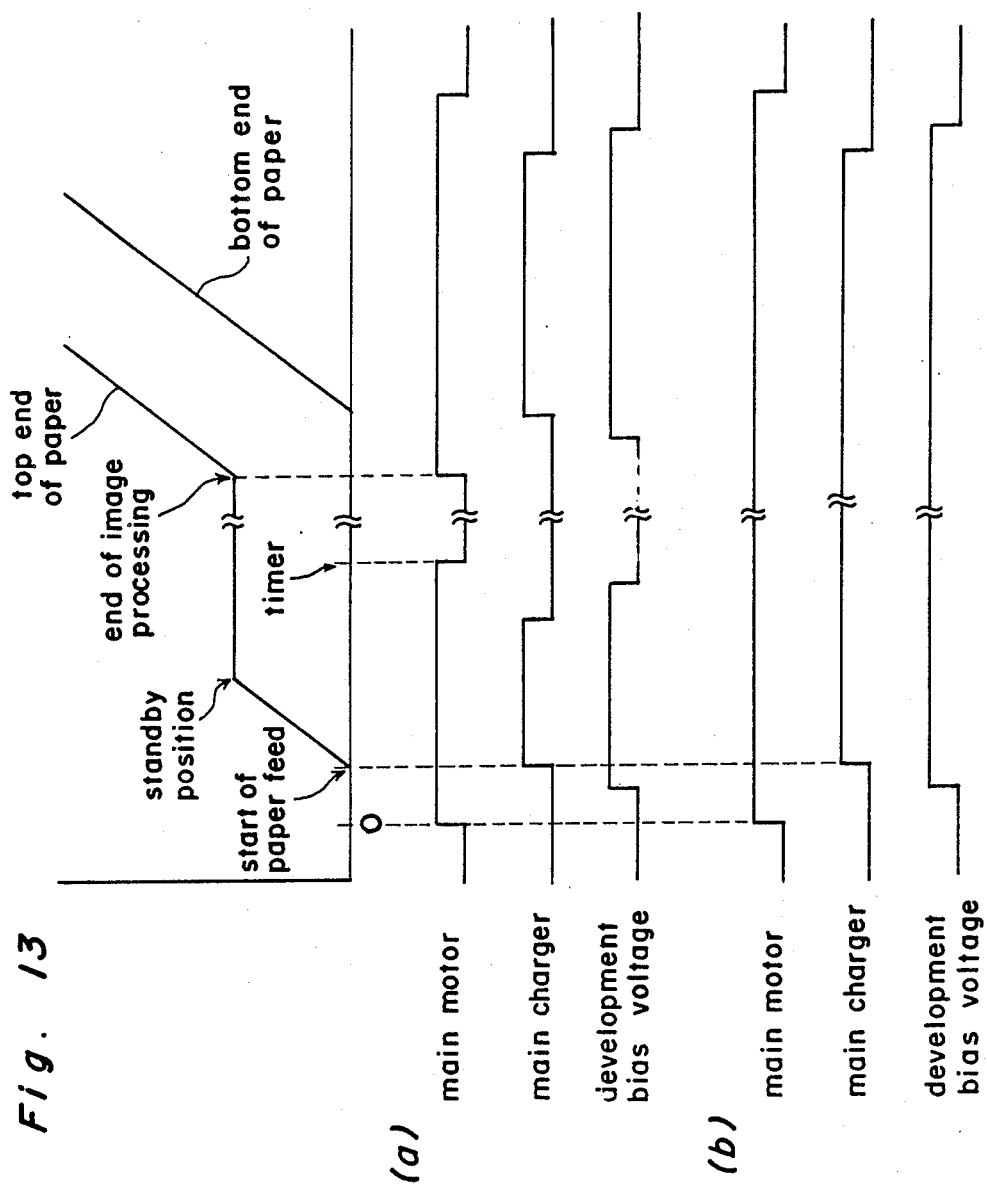

ELECTROPHOTOGRAPHIC PRINTER WITH IMPROVED TIMING ARRANGEMENTS

This is a continuation of application Ser. No. 915,806 filed on Oct. 6, 1986 now abandoned.

BACKGROUND OF THE INVENTION

1. Field of the Invention

The present invention relates to a printer which makes use of improved timing arrangements for an electrophotographic process.

2. Description of the Prior Art

A printer which makes use of an electrophotographic process can print transmitted data in units of a page. Parts of the printer such as photoconductor drum cannot be stopped in the midst of a page after the image formation on the photoconductor drum starts.

In such a printer, usually a printing process is started after the transmitted data to be contained in the unit of a page has been transformed into internal codes for printing. Therefore, a print engine which makes use of an electrophotographic process must keep waiting for the completion of the transformation of one page data. After the transformation has been completed, a paper is fed to a predetermined position near the photoconductor drum, and the printer starts the known electrophotographic process. That is, the photoconductor drum is driven and is exposed to a light beam according to the image data so as to form a latent electrostatic image, and the latent electrostatic image is developed with toner and the toner image is transferred on the paper which is carried from the predetermined position according to the rotation of the photoconductor drum.

Thus, it takes a time to feed a paper to the predetermined position from the completion of the transformation till the start of printing. When a large amount of data is printed at a high rate, such times are cumulative and cannot be neglected as to the print efficiency.

SUMMARY OF THE INVENTION

An object of the present invention is to provide a printer which can print at a high efficiency.

Another object of the present invention is to provide a printer which can print at a high efficiency without unnecessary lowering of the life of electronic parts of the printer.

To this end, according to the present invention, there is provided a printer which makes use of an electrophotographic process which comprises: a communication means for receiving data to be printed; a transformation means for transforming the data received by the communication means into intermediate codes different from those of the data; a memory means for storing the intermediate codes transformed by the transformation means; an output control means for reading the intermediate codes from the memory means and for sending output signals for exposure of a photoconductor of the printer according to said intermediate codes; a print means for printing a latent electrostatic image formed on the photoconductor on the paper having been fed thereto; a feed means for feeding a paper to the print means; and a feed control means for making the feed means feed a paper to a predetermined stop position near the print means after the transformation of the one page data into intermediate codes has been started and for making the feed means feed the paper to the print means when the transformation has been completed.

Another printer according to the present invention which makes use of electrophotographic process, comprises: a communication means for receiving data to be printed; a transformation means for transforming the data received by the communication means into intermediate codes different from those of the data; a memory means for storing the intermediate codes transformed by the transformation means; an output control means for reading the intermediate codes from the memory means and for sending output signals for exposure of a photoconductor of the printer according to said intermediate codes; a print means for printing a latent electrostatic image formed on the photoconductor on the paper having fed thereto; a feed means for feeding a paper to the print means; a timer means for sending a signal when the time of the transformation by the transformation means exceeds a predetermined time; and a print control means for causing the print means to be brought into a standby mode when said signal is received from the timer means.

A still another printer according to the present invention which makes use of electrophotographic process, comprises a communication means for receiving data to be printed; a transformation means for transforming the data received by the communication means into intermediate codes different from those of the data; a memory means for storing the intermediate codes transformed by the transformation means; an output control means for reading codes from the memory means and for sending output signals for exposure of a photoconductor of the printer according to said intermediate codes; a print means for printing the latent electrostatic image formed on the photoconductor on the paper having been fed thereto; a feed means for feeding a paper to the print means; a feed control means for making the feed means feed a paper to a predetermined stop position near the print means in advance after the transformation of the one page data into the intermediate codes has been started and for making the feed means feed the paper from said stop position to the print means; a timer means for sending a signal when the time of the transformation by the transformation means exceeds a predetermined time; and a print control means for controlling the print means so as to bring it into a standby mode and controlling the feed control means and the timer means in such a relation as to prohibit feeding of the next paper to the stop position when said signal is received from the timer means.

A further printer according to the present invention which makes use of electrophotographic process, comprises a communication means for receiving data to be printed; a transformation means for transforming the data received by the communication means into intermediate codes different from those of the data; a memory means for storing the intermediate codes transformed by the transformation means; an output control means for reading codes from the memory means and for sending output signals for exposure of a photoconductor according to said intermediate codes; a print means for printing the latent electrostatic image formed on the photoconductor on the paper having been fed thereto; a feed means for feeding a paper to the print means; a feed control means for making the feed means feed a paper to a predetermined stop position near the print means after the transformation of the one page data into intermediate codes has been started; a decision means for deciding whether the print means should be brought into a standby mode or not according to predetermined conditions after the print means has been started to operate once; and a print control means for controlling the print means so as to bring it into the standby mode and however so as not to bring predetermined constituent parts of the print means, which need a long warm up time on the resumption of printing and can be allowed to operate in the standby mode thereof when it is decided that the print means should be brought to the standby mode.

It is advantage of the present invention to provide a printer which can print at high efficiency.

It is another advantage of the present invention to provide a printer which can prevent unnecessary lowering of the life of constituent parts of an electrophotographic process unit when they are waiting wastefully for the completion of the processing of the transmitted data.

BRIEF DESCRIPTION OF THE DRAWINGS

The present invention will now be described with reference to the drawings wherein.

FIGS. 12 and 13 are each timing charts of the image forming process unit;

DESCRIPTION OF PREFERRED EMBODIMENTS

Figure 1:
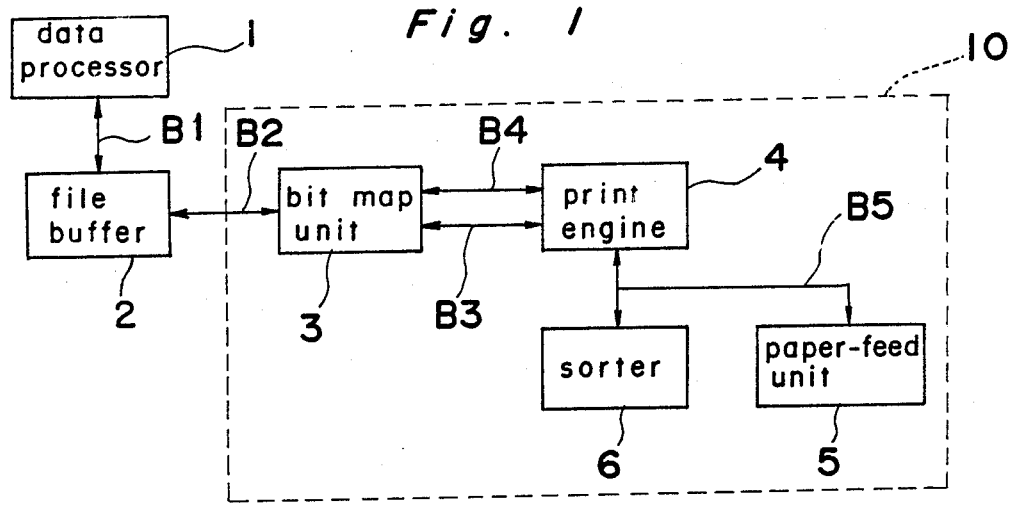
FIG. 1 is a block diagram of an electrophotographic printer according to an embodiment of the present invention.

Referring to the drawings, a preferred embodiment of the present invention will be explained in the following order;

(a) Constitution of electrophotographic printer control
(b) Data transformation into internal codes
(c) Standby mode
(d) Bit-map control
(e) Interface control
(f) Control of electrophotographic process
(g) Print head control (a) Constitution of electrophotographic printer FIG. 1 shows the constitution of a system which includes a printer system 10 according to an embodiment of the present invention. The printer system 10 can print graphic data as well as character data. Data provided from a data processor 1 such as a host computor is stored once in a file buffer 2 in order to improve the throughput of the data processor 1. Then, the data is transmitted to the printer system 10.

The printer system 10 consists of a bit map unit 3 (that is, a data processing unit of the bit-map type), a print engine 4 which uses an electrophotographic process and a laser, and accessories such as an external paper-feed unit 5 and a sorter 6.

The print engine 4 itself has been known for example in U.S. Pat. No. 4,059,833. Therefore, detailed explanation of the print engine 4 will be omitted here.

Figure 2:
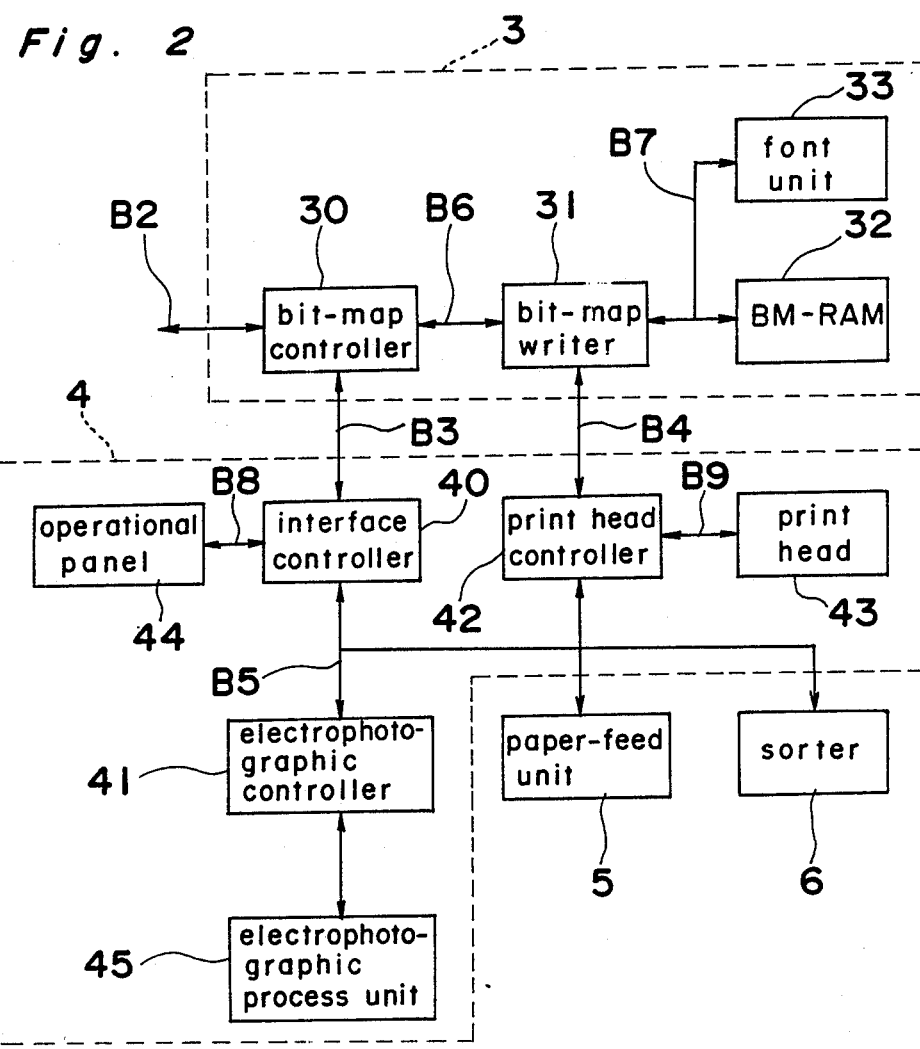
FIG. 2 is a block diagram of a data process unit of the bit-map type and a print engine.

FIG. 2 shows a block diagram of the printer system 10.

The bit map unit 3 consists of a bit-map controller 30 (refer FIG. 3), a memory 32 for bit-map (hereinafter referred to as BM-RAM), a bit-map writer (refer FIG. 4) which can draw a graphic image in BM-RAM 32, and a font unit 33. The bit map unit 3 is connected to the print engine 4 via a bus B3 for control data (for example, the number of paper, and the control of accessories) and via a bus B4 for image data.

The print engine 4 comprise three controllers 40, 41, 42. An interface controller 40 processes the control data received from the bit-map controller 30, controls an operational panel 44, and controls the timings of the whole print engine 4. An electrophotographic controller 41 (refer FIG. 6) controls an electrophotographic process unit 45 according to the data sent from the interface controller 40 via an internal bus B5. A print head controller 42 (refer FIG. 7) controls the emission of light of a semiconductor laser 431 and the rotation of a polygon motor 432 of a print head 43 (refer FIG. 7) in order to write image data sent from the interface controller 40 via the internal bus B5. The external paper-feed unit 5 and the sorter 6 are also controlled by the interface controller 40 via the interface bus B5.

The above-mentioned print system 10 is a laser printer of the bit-map type. The print data, most of which are expressed as codes, are received from the external (the data processor 1 and the file buffer 2), and they are written as an actual print image in BM-RAM 32 of the bit-map unit 3. Then, the image is sent to the print engine 4. The print engine 4 records the data received from the bit-map unit 3 on a photoconductor and transfers them on a paper.

The data received from the processor 1 include not only print data but also codes for the control of the form of print and for the setting of the mode of the print engine 4.

The bit-map unit 3 analyses such protocols besides the print data, and sends instructions of form control and, if necessary, of paper feed and mode setting. The print engine 4 processes the above-mentioned record control and necessary controls accompanied by the record control such as the control of an electrophotographic system and the timing control of paper feed. The control of the print engine 4 is similar to that of an electrophotographic copy machine except the scan system.

Figure 3:
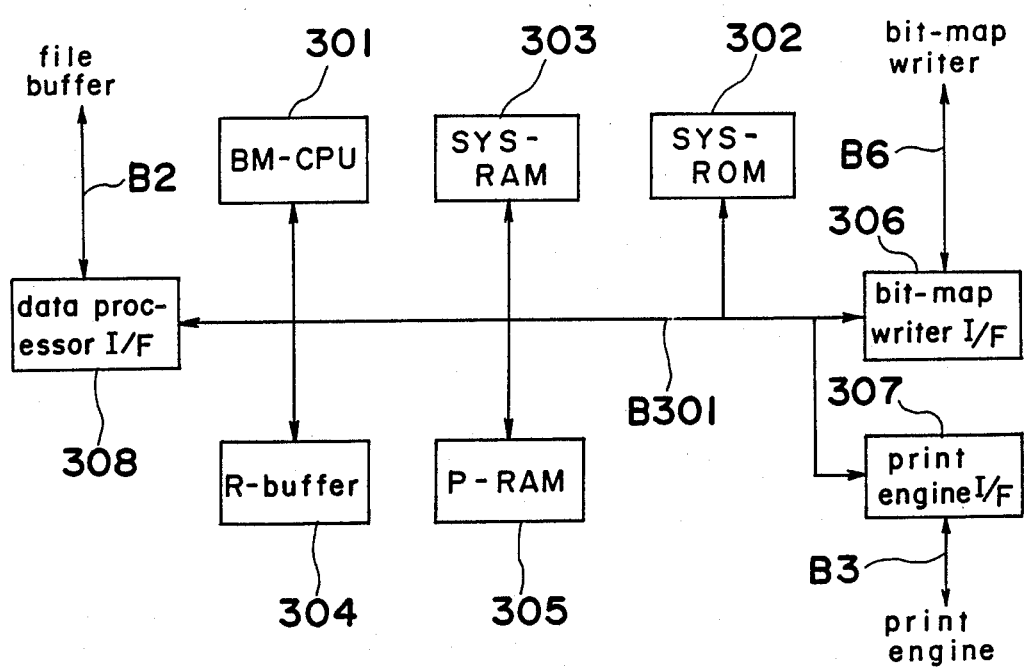
FIG. 3 is a block diagram of a bit-map controller.

FIG. 3 shows a block diagram of the bit-map controller 30 which is composed of several blocks connected to each other via an internal bus B301. A microprocessor 301 referred to as BM-CPU is a central controller of the bit-map controller 30. That is, BM-CPU 301 communicates with the processor 1 and the file buffer 2 via a data-processor interface 308, transforms the print data received, controls the bit-map writer 31 via a bit-map writer interface 306, and controls the print engine 4 via a print-engine interface 307. A memory 302 called SYS-ROM stores the program of BM-CPU 301. A memory 303 referred to as SYS-RAM 303 is a work area of BM-CPU 301, and stores data such as stacks and flags.

A buffer 304 referred as R-buffer 304 is a buffer for the communication with the external (the data processor 1 and the file buffer 2); it is used for the processing program of BM-CPU 301 asynchronous with respect to the communication with the external.

A memory 305 referred to as P-RAM 305 stores intermediate codes which are generated by transforming the data sent from the external according to the attributes of the fonts. Intermediate codes are used in order to draw an image fast in BM-RAM 32, as will be explained below. The actual drawing of fonts in BM-RAM 32 is done by the bit-map writer 31. Addresses for accessing font pattern and parameters such as addresses for drawing the data in BM-RAM 32 should be calculated according to the data sent to the bit-map writer 31. The calculation needs a time. Then, in order to increase the print efficiency, the data of a next page are transformed into intermediate codes and stored in P-RAM 305 during the printing of the data stored in BM-RAM 32. The data in P-RAM 305 are stored by First-In-First-Out processing.

The print-engine interface 307 is an interface with the print engine 4. That is, it communicates JOB data such as the print number and JOB control commands such as print command to the interface of the print engine 4 via the bus B3.

Figure 4:
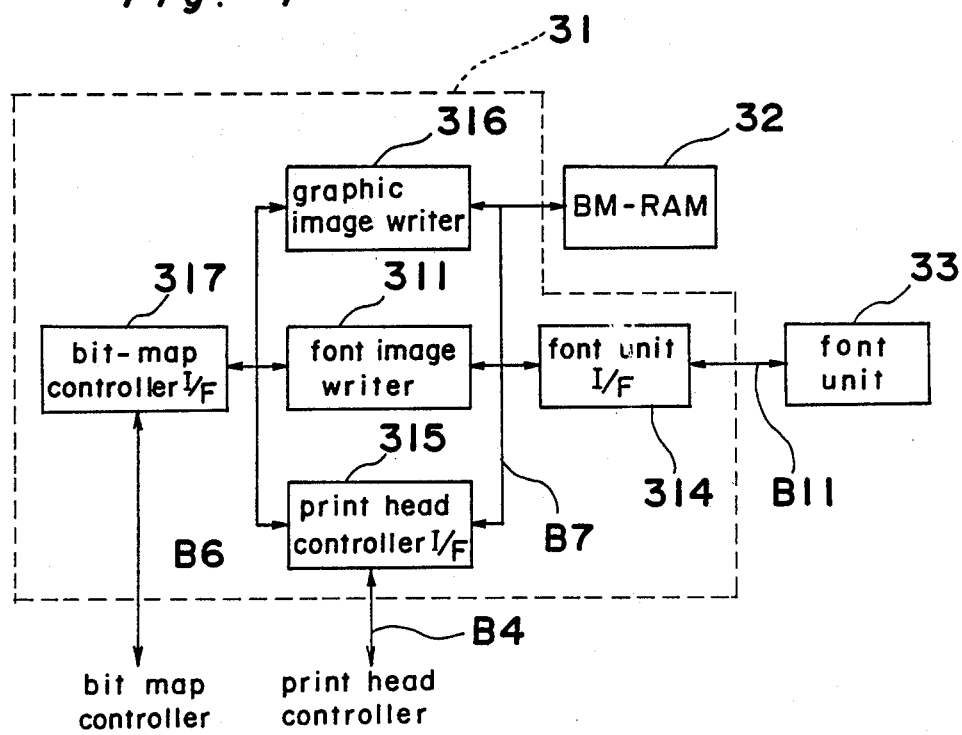
FIG. 4 is a block diagram of a bit-map writer.

FIG. 4 shows a block diagram of the bit-map-writer 31, which has a function of drawing an image in BM-RAM 32 and another of sending the data stored in BM-RAM 32 to the print engine 4 on printing. The function of drawing an image in BM-RAM 32 includes in detail the drawing of a line or a circle by a graphic-image writer 316 and the drawing of fonts by a font image writer 311. Both 311, 316 are logic circuits which operate according to the internal codes sent from the bit-map controller 30 via a bit-map controller interface 317. Almost all processings of the graphic-image-writer 316 are to analyse the parameters in intermediate codes and to draw a graphic image in BM-RAM 32, while almost all processings of the font-image writer 311 are to read a front image according to the data of intermediate codes from the font unit 33 via a font unit interface 314 and to draw the font image in BM-RAM 32.

On the other hand, a print-head controller interface 315 has a function of sending data on printing. That is, when it receives a print start command sent by the bit-map controller 30 via the interface 317, it sends the data of BM-RAM 32 to the print-head controller 40 according to syncronous signals send by the print-head controller 42 (refer FIG. 7) of the print engine 4 via the bus B4.

Figure 5:
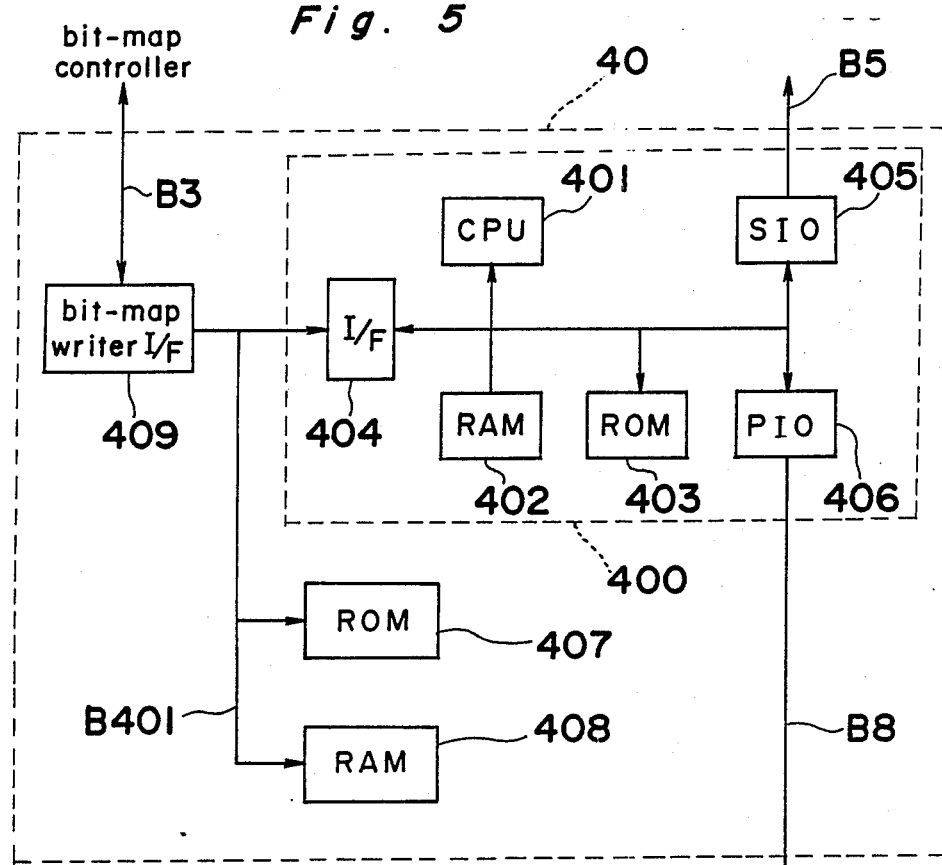
FIG. 5 is a block diagram of an interface controller.

FIG. 5 shows a block diagram of the interface controller 40 of the print engine 4. The interface controller 40 includes a one-chip microprocessor (IFC-CPU) 400 as a principal part. IFC-CPU 400 consists of a CPU 401, a RAM 402, a ROM 403, an interface 404 connected to an external bus B401, a serial input-output (SIO) circuit 405 for serial communication and a parallel input-output (PIO) circuit 406 for parallel communication. SIO 405 controls a bus B5 for controlling the electrophotographic controller 41 and the print head controller 42, while PIO 406 is used for controlling the operational panel 44. IFC-CPU 400 is connected via the extended bus B5 to an external ROM 407, an external RAM 408 and an interface 409 for the bit-map controller 30. The external ROM 408 can supplement the internal RAM 402. The internal ROM 402 stores the standard program, while the external ROM 407 can store a program different in specifications.

Figure 6:
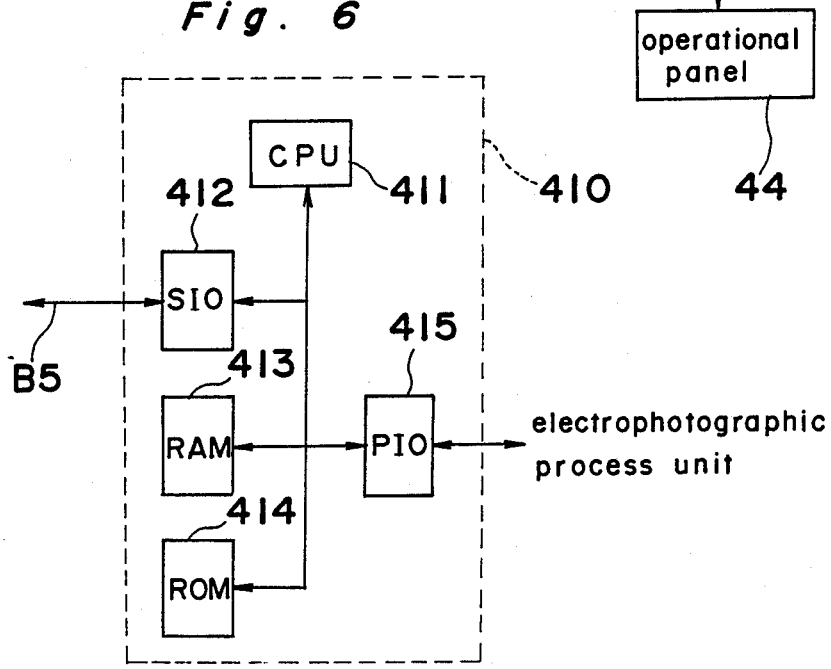
FIG. 6 is a block diagram of an electrophotographic controller.

FIG. 6 shows a block diagram of the electrophotographic controller 41, which is controlled by a one-chip microprocessor MC-CPU 410 similar to IFC-CPU 400. In MC-CPU 410, a CPU 411 is connected to a RAM 413, ROM 414, a serial input-output circuit (SIO) 412 for the communication with the interface controller 40 via the bus B5, and a parallel input-output circuit (PIO) for the control of the electrophotographic process. The program is not extended in an external memory in contrast to IFC-CPU 400.

Figure 7:
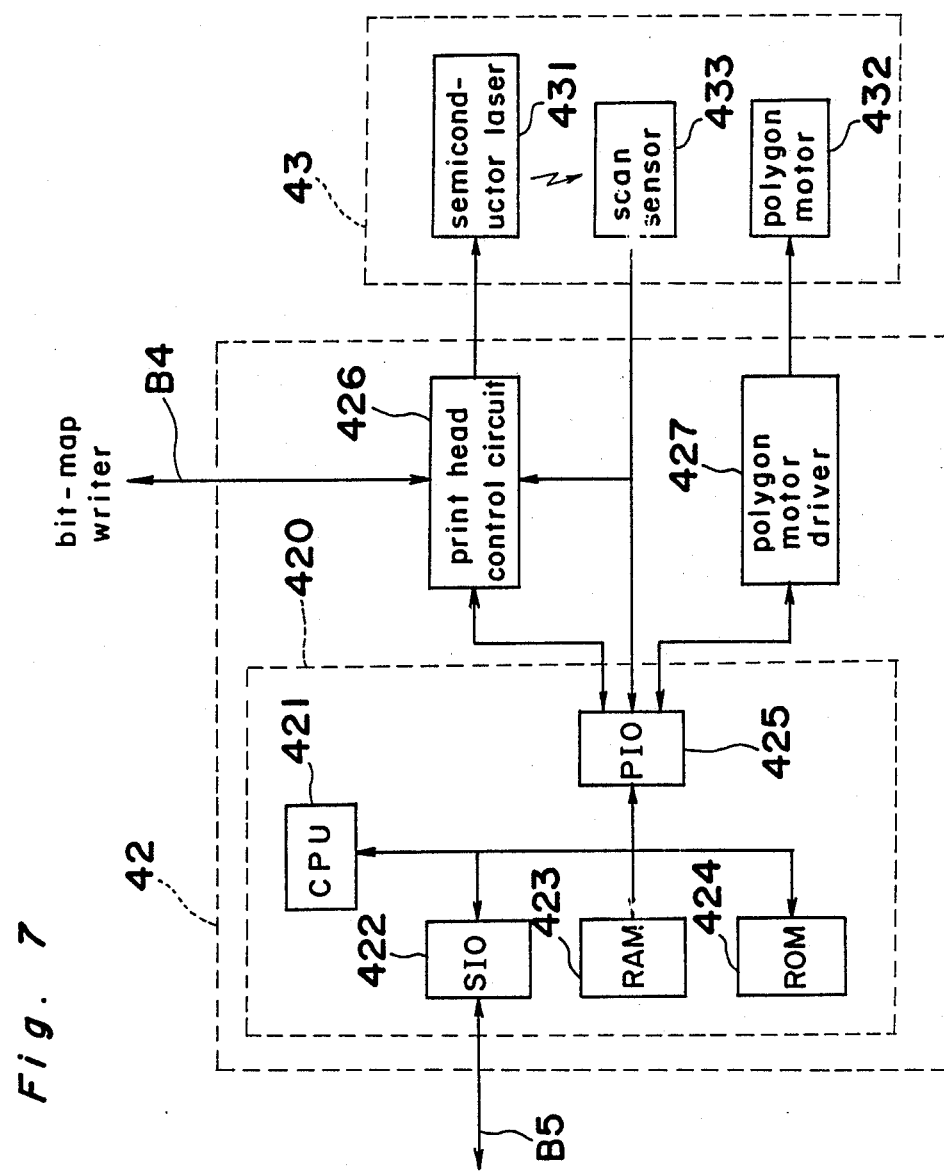
FIG. 7 is a block diagram of a print-head controller and a print head.

FIG. 7 is a block diagram of the print head controller 42, wherein the rotation of a polygon motor 432 of the print head 42 is controlled according to the data sent from the interface controller 40 via the bus B5 and the emission of light of a semiconductor laser means 431 is controlled according to the image data sent from the bit-map writer 31 via the bus B5 synchronously to the signals (SOS) from a laser scan sensor 433.

The print head controller 42 has a one-chip microprocessor (PHC-CPU) 420 composed of a CPU 421, a RAM 423, a ROM 424, a serial input-output circuit (SIO) 422 and a parallel input-output circuit (PIO) 425. SIO 422 is connected to the bus B5 for the communication with the interface controller 40, while PIO 425 is connected to a driver 427 of a polygon motor 432, to the scan sensor 433 and to a print head control circuit 426 which controls the semiconductor laser 431.

The image data sent via the bus B4 are parallel data so that the print head control circuit 426 transforms it to serial data in order to emit the semiconductor laser 431 successively according to the image data. The control circuit 426 also generates timing signals in order to make the data transmission synchronously.

(b) Data transformation into internal codes

Data received from the external (the external processor 1 and the file buffer 2) and stored in R-buffer 304 includes four kinds of data: print engine code, job control code, form control code and print code. Among them, print codes (print characters) are transformed by the bit map controller 30 into internal codes, which are written in turn in P-RAM 305 (refer FIG. 10). The form of internal code consists of a font address of the font unit 33, an address of BM-RAM 32 (which is controlled by the control modes) and a write mode. Job control codes which define the start of a job and the end of a page are also written in P-RAM 305.

Figure 8A:
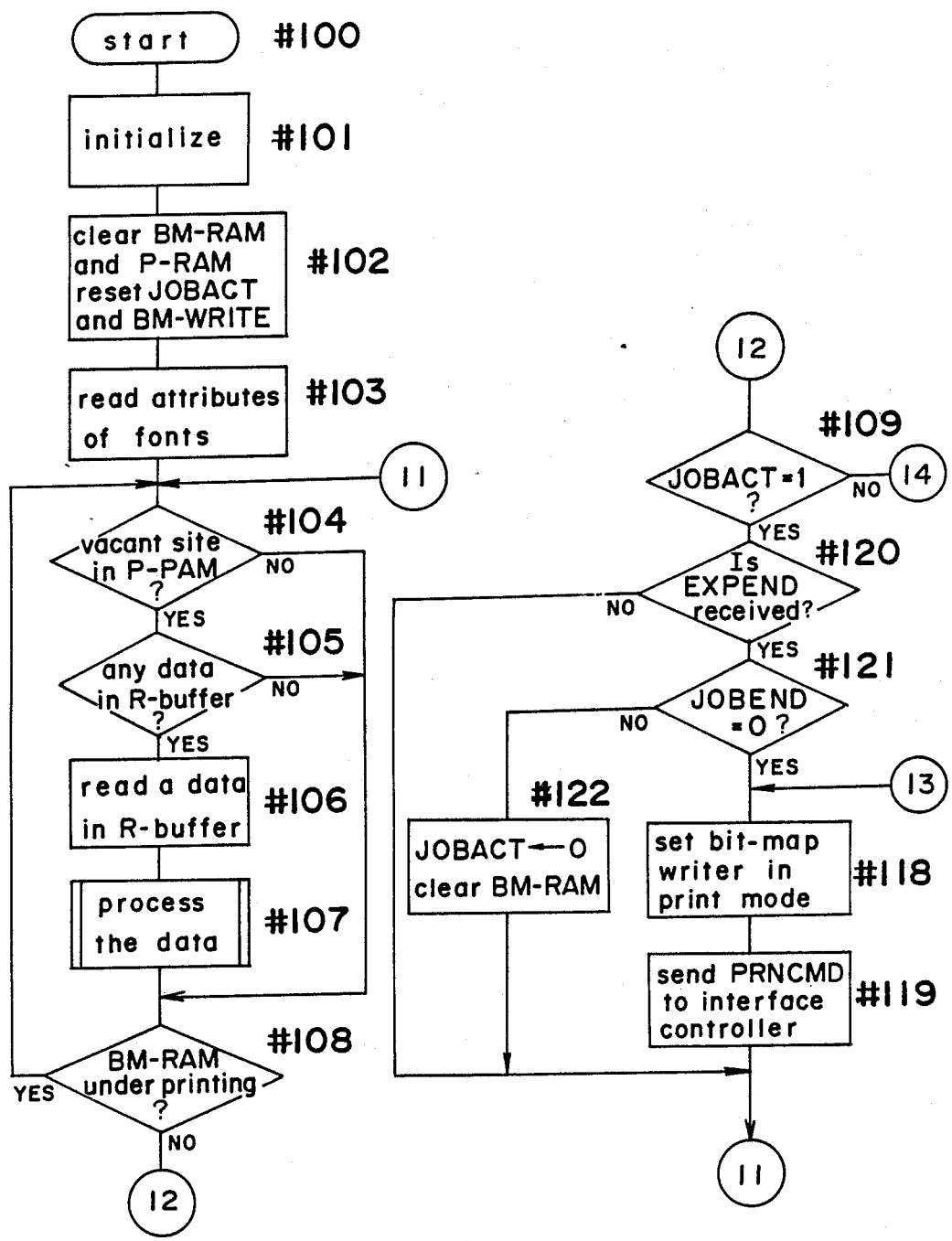
FIGS. 8(A) and (B) are flowcharts of the processing of the bit-map controller.
Figure 8:
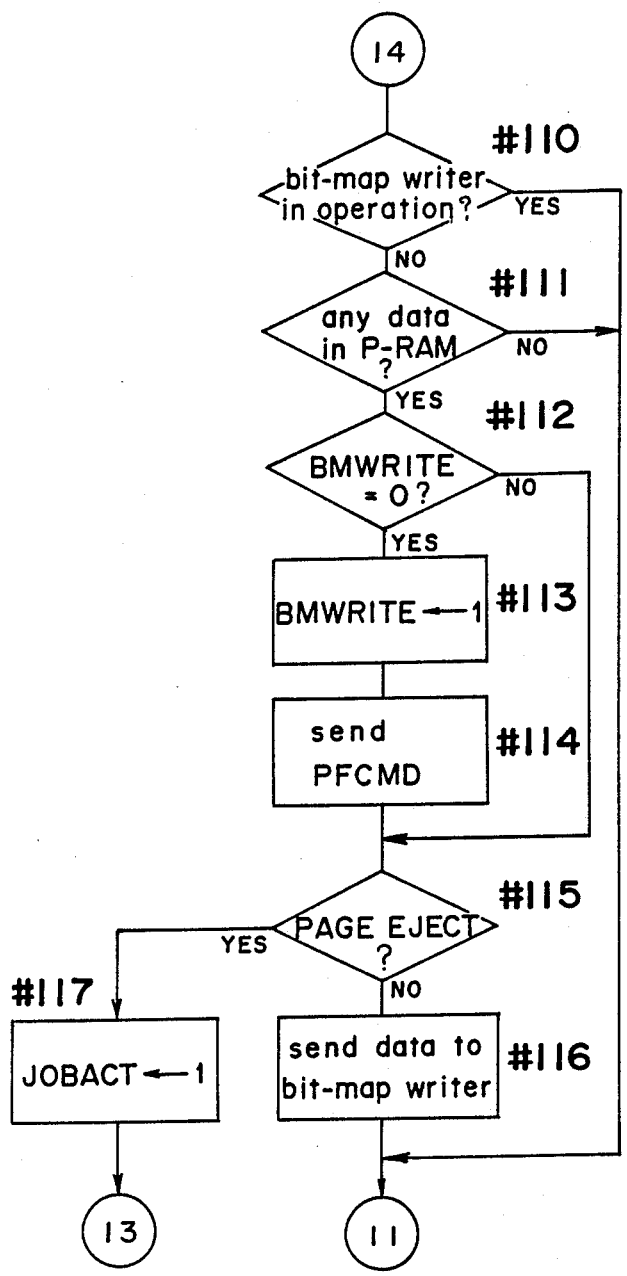

When an image is written in BM-RAM 32, internal codes stored in P-RAM 305 are read, and a font data of the address of internal code is read and is written in BM-RAM at the address of internal codes according to the write mode of internal code (refer step #116 in FIG. 8).

Because the data received from the external device is transformed beforehand into intermediate code, the time necessary for drawing an image in BM-RAM can be shorten.

(c) Standby mode

In a prior art printer which makes use of electrophotographic process, after the transformation of data into internal codes is completed, a paper is fed to the predetermined position or to the timing rollers and the print engine starts the electrophotographic process. On the contrary, in a printer according to an embodiment of the present invention, a paper is fed to the timing rollers in advance when a first data of a page of image starts to be drawn in BM-RAM 32 (refer an upper diagram in FIG. 12), and the paper is kept waiting at the timing rollers (not shown). On the other hand, the print engine 4 prepares the electrophotographic process. When the transformation of a page of data is completed, the print engine 4 starts printing readily. Thus, an unnecessary wait time can be saved, and, therefore, efficiency on printing can be improved. Further, bad effects to the electric power source on the instant of the stop and the resumption of printing can be avoided.

If the print engine 4 is kept waiting for the completion of the transformation of one page data in the driving mode even when the transformation time becomes long, lives of parts such as the photoconductor drum, the cleaning blade and the polygon motor lowers wastefully. Such cases occur, for example, when a large amount of data such as a graphic data is transmitted, when the calculation of data to be printed needs a long time, or when an operator errs so as to delay the completion.

In an embodiment of the present invention, the image-forming process unit is stopped if the completion of the transformation time of a page of data becomes longer than a predetermined time. Thus, the wastful lowering of the life of parts such as the photoconductor drum can be prevented.

After the completion of the transformation, the print engine 4 starts again, and the paper which has been kept waiting at the timing rollers is carried to the photoconductor drum.

As for the paper feed, the next paper is prohibited to be fed beforehand to the timing rollers, and the paper feed and the image-forming process will be started after the completion of the transformation of the data of the next page. This is based upon the fact that data of the same kind is liable to follow. For example, the next data would be a graphic data if the present data are graphic data by which the print engine is stopped. Thus, the wasteful motion of the image-forming unit can be prevented in the next printing.

Some parts such as a polygon motor used for the exposure need a long time to become stable so may delay the resumption of the operation of the image-forming process unit. Then, such parts are kept operating even when the transformation periods are longer than the predetermined time, in order to improve the efficiency of printing.

(d) Bit-map control

Figure 9:
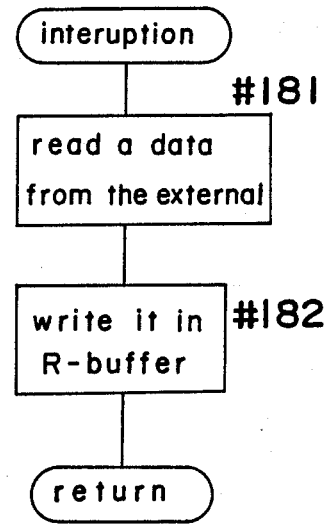
FIG. 9 is a flowchart of the processing of the received data.
Figure 10:
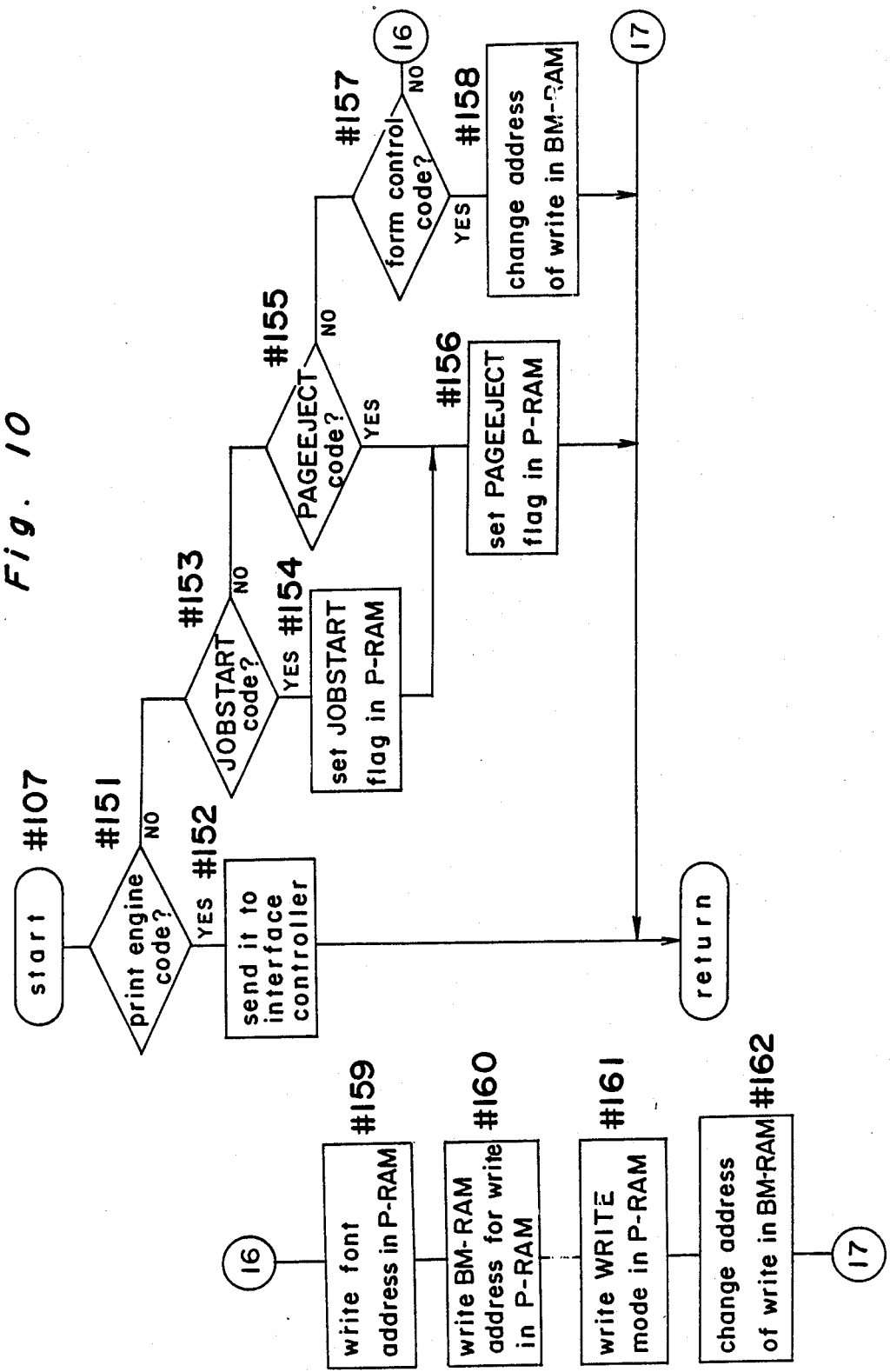
FIG. 10 is a flowchart of the interruption on the reception of the data.

FIGS. 8-10 show flowcharts on the processing of the bit-map controller 30.

In FIGS. 8(A) and (B) when the electric power source is turned on (step #100), the bit-map controller 30 is initialized (step #101). Next, BM-RAM 32 for print image area and P-RAM 305 for the storage of data transformed into internal codes are cleaned, and JOBACT flag which indicates the status of the printing operation and BM-WRITE flag which indicates the write-status of BM-RAM 32 are all reset for the initialization (step #102). Then, the attributes of fonts are read from the font unit 33 (step #103). As will be explained in (f), the electrophotographic controller 41 starts controlling the temperature of the fixer and starts a cooling fan in operation (step #301, standby mode 1).

Next, a loop for the processing of data starts. The data received is processed as follows. First, it is decided whether P-RAM 305 has a vacant site to store data further (step #104). If the decision is yes, an interrupt routine shown in FIG. 9 starts for the reception of a data. That is, data is read from the external 1, 2 (step #181), and the data in written is R-buffer 304 of the bit-map controller 30 (step #182).

In the routine shown in FIG. 8, it is decided next whether any data exists in R-buffer 304 (step #105). If the decision is yes, data stored in R-buffer 304 is read (step #106), and it is processed according to the kind of the code (data) according to a flow shown in FIG. 10 (step #107).

FIG. 10 shows the processing of the data received from the external 1, 2. Four kinds of the data exit: print engine code, job control code, form control code and character code. A print engine code is sent to the interface controller 40 (step #151, #152). Job control codes include both PAGEEJECT code for indicating an end of a page and JOBSTART code for indicating the start of a job. A job means a unit of printing to be done by the printer, and consisting of a group of pages. Job control codes are stored in P-RAM 305 as corresponding flags (step #153–#156). In cases of form control codes (step #157), the address for the write of the next character in BM-RAM 32 is changed (step #158). Data other than print engine codes, JOB control codes and form control codes are regarded as character codes, JOB control codes and form control codes are regarded as character codes, and they are transformed into intermediate codes and are stored in P-RAM 305 in order to send them to the bit-map writer 31. The form of intermediate code consist of a font address (step #159), an address for the write in BM-RAM 32 (step #160) and a write mode (step #161). Then, the address for the write in BM-RAM 32 of the next font is changed according to for example the size of font. However, the address is not changed in case of graphic drawing.

In FIG. 8, after the data is processed as mentioned above, it is decided whether BM-RAM 32 is used for printing (step #108). If BM-RAM 32 is used for printing (step #108), the program returns to step #104, and the loop starts again.

If BM-RAM 32 is not used for printing (step #108), it is decided next whether the print system is under printing (JOBACT=1) or not (step #109).

If the decision is no, intermediate codes written in P-RAM 305 (step #111) are sent to the bit-map writer 31 (step #116) as far as the bit-map writer 31 is not writing a previous character (step #110). If a first data is written in BM-RAM 32 (BMWRITE flag=0) (step #111, #112). BMWRITE flag is set to be one (step #113), and PFCMD command is sent to the interface controller 40 (step #114). This command is used in order to feed a paper in advance to the predetermined position (timing rollers) in the print engine 4, and this makes the bit map unit 3 ready for printing (step #305–#311 in FIG. 14). Then, the exposure of laser beam on a photoconductor becomes ready. Thus, the throughput of printing is improved owing to the shortening of the paper-feed time.

As far as any data existing in P-RAM 305, the data is sent to the bit-map writer 31 successively. However, if a PAGEEJECT code is detected (step #115), the transformation of a page of data is completed so that the printing of the data starts. First, JOBACT flag is set (step #117) in order to prohibit the write in BM-RAM 32 and the renewal of BM-RAM 32, the print-head controller interface 315 is set to be a print mode (step #118), and a command (PRNCMD) is sent to the interface controller 40 (step #119). The command makes the print-head controller interface 315 send the data of BM-RAM 32 via the bus B4 to the print engine 4. Finally, the program returns to step #104.

When the print engine 4 is under printing, the decision in step #108 becomes NO owing to the check of the status of the print-head controller interface 315. Then, only the process from step #104 to #107 are iterated that the data received is transformed and is stored in P-RAM 305 for the next printing.

When the printing is completed, JOBACT flat has been set still. Then, the program is proceeded from step #109 to step #120, and a command EXPEND which indicates the end of the exposure is waited to be sent from the interface controller 40 (step #413) because the number of papers on multi print is controlled by the interface controller 40. If JOBEND flag which is a parameter of the command is set (step #121). JOBACT flag is rest and BM-RAM 32 is cleared (step #122), and the preparation for print of the next page is started. If the multi print operation is not yet completed (JOBEND=0) (step #121), the next print of the same data of BM-RAM is started (step #118 and the followings).

(e) Interface controller

Figure 11A:
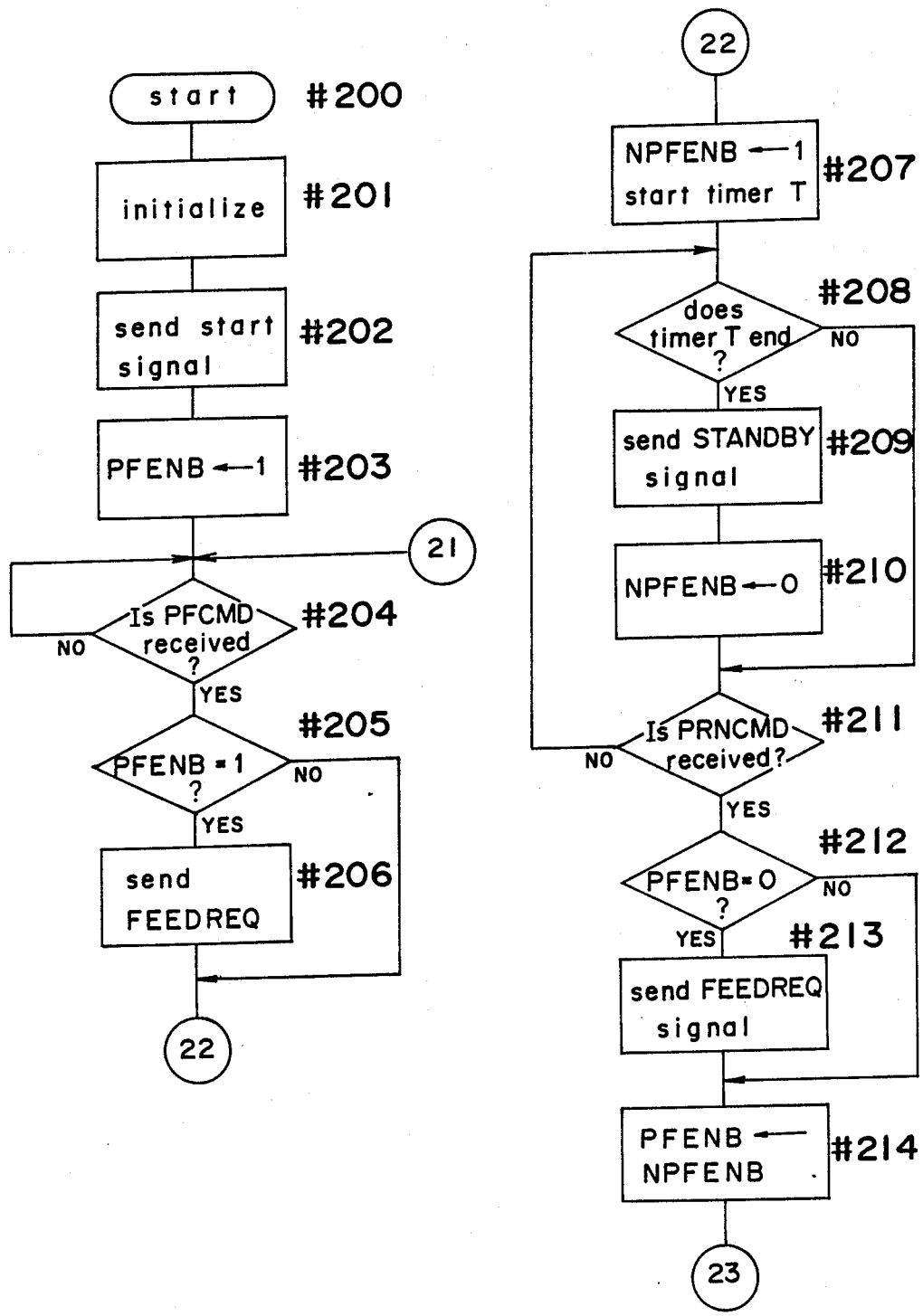
FIGS. 11(A) and (B) are flowchart of the processing of the image-forming process unit.
Figure 11B:
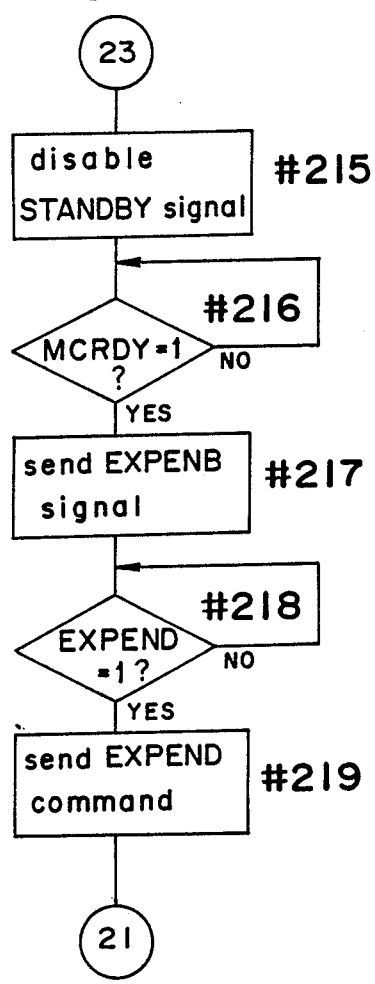

FIG. 11 shows a flow of the processing of the interface controller 40. When the electric power source of the print engine 4 is turned on, the program is started. After the interface controller 40 is initialized (step #201), a start signal is sent via the bus B5 to the electrophotographic controller 41, the print-head controller 42, the sorter 6 and the external paper-feed unit 5 in order to initialize the whole system of the print engine 4 (step #202). Then, the PFENB flag which indicates the paper-feed to the predetermined position is set to be the initial value of one (step #203).

In the following loop of processing, first the command PFCMD (refer step #114) which instructs the paper feed in advance is waited until it is sent from the bit-map controller 30 (step #204). When the command PFCMD is received and if the paper-feed in advance is enabled (PFENB=1) (step #205), a signal FEEDREQ which indicates to require to feed a paper is sent to the electrophotographic controller 41 via the bus B5 (step #206). Then, the electrophotographic controller 41 makes the electrophotographic process unit 45 start for the paper feed and the printing. Then, the paper stops at the predetermined position (timing rollers) near the photoconductor drum and the unit 45 is in the standby state (the "paper-in-advance" state). If the external paper-feed unit 5 is designated, the electrophotographic controller 41 makes only the electrophotographic process unit 45 start, and a paper is fed by the external paper-feed unit 5 to the same position.

Next, the interface controller 40 sets a temporary value of one of the NPFENB flag which indicates the permission of the feed of a next paper in advance to the predetermined position and starts a timer T (step #207). The timer T has two functions. One function is to send a STANDBY signal to the electrophotographic unit 45 (step #209) after the time T passes (step #208). This makes the print engine 4 to be in the stop state (the standby mode 2). The standby mode 2 in the present invention differs from the auto shut of a usual printer and a usual electrophotographic copy machine in the following points: (1) A paper is kept to be waited at the predetermined position. (2) The transformation of the received code to the data to be printed is in progress. This function improves the life of the photoconductor drum and other parts of the electrophotographic unit 45. That is, the electrophotographic unit 45 is prevented to be in the operational mode wastefully when the drawing in BM-RAM 32 of the bit-map controller 30 needs a time longer than the timer T. When the print engine 4 becomes in the standby mode 2, the next paper-feed and electrophotographic process starts after the transformation of a page of the received data to intermediate codes is completed. Another function of the timer T is to prevent the paper feed in advance of the next printing by resetting the NPFENB flag which indicates the permission of the next paper-feed. Usually, the same kind of information is likely to be printed in a job. (For example, graphic data will be printed successively.) The function takes this into account, and can prevent the lowering of the life of the print engine 4. This function lowers the throughput. However, though the paper feed in advance is forbidden once, a paper is fed in advance of the next printing if a print command PRNCMD is received before the timer T ends so as to keep the NPFENB flag to be set. (Usually, a paper is fed in advance before the completion of the transformation of data and is kept at the standby position, and the throughput does not lower.) The abovementioned two functions improves the throughput and prevents the unnecessary lowering of the life of the copier.

If the interface controller 40 receives a print command PRNCMD (step #211), a signal FEEDREQ which indicates to require a paper feed is sent (step #213) when a paper has not been fed in advance (PFENB=0) (step #212). Then, the interface controller 40 renews the PFENB flag of the next printing (step #214). That is, when the data to be printed is generated, a paper is fed to the predetermined position (refer steps #304, 321, 307–311).

Then, the STANDBY signal is stopped to be fed (step #215), that is, the standby mode 2 is cancelled. If a signal MCRDY which indicates that the image-forming process unit of the electrophotographic controller 41 becomes stable is received from the electrophotographic processing unit 45 (step #216), a signal EXPEND which indicates the exposure is enabled is sent to the print-head controller 42 which controls the exposure (step #217). The print-head controller 42 sends a signal EXPEND when the exposure is completed (refer step #413). If the interface controller 40 detects the EXPEND signal (step #218), it sends EXPEND command to the bit-map controller 30 (step #219), and the process is returned to step #204.

Figure 12:
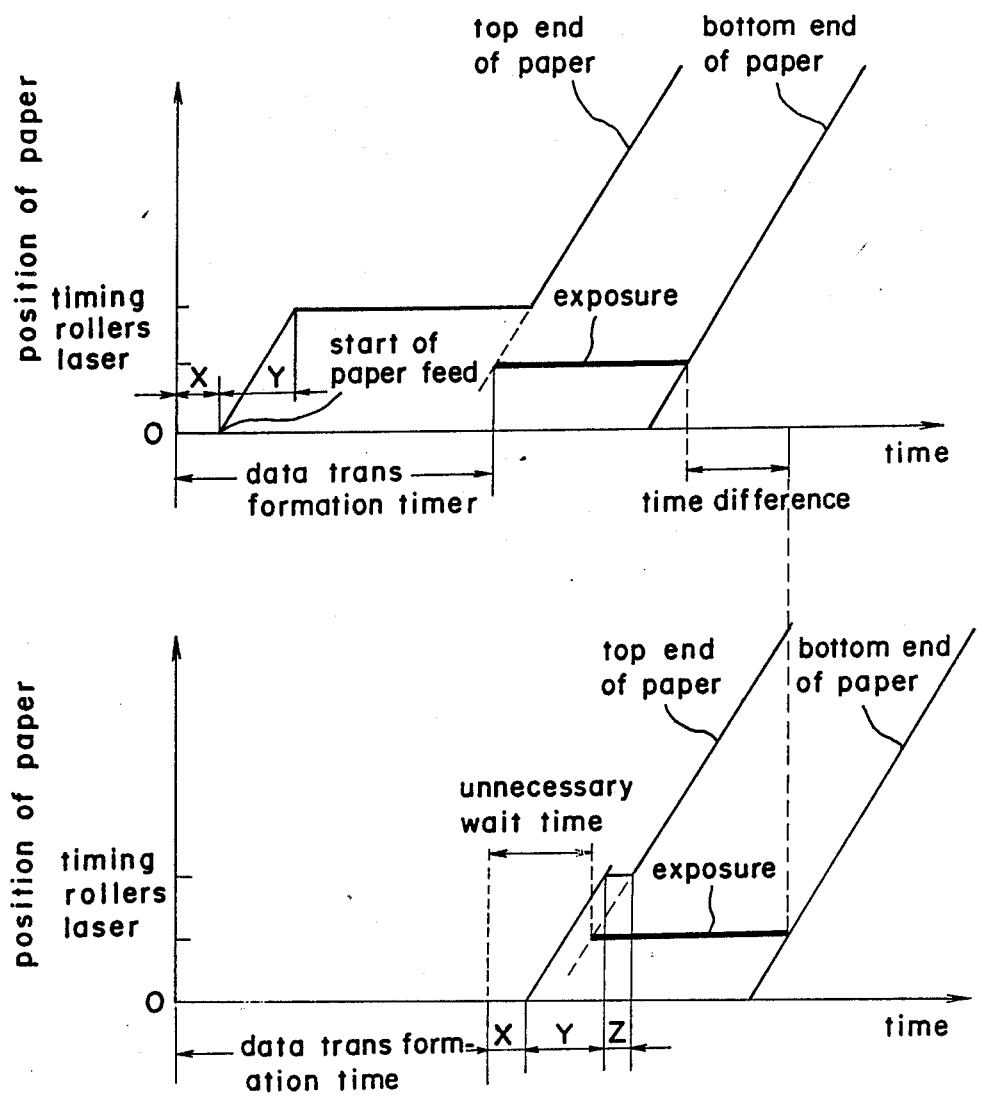

FIG. 12 shows the timing chart of printing, wherein X is the time that the main motor becomes stable after the start and Y is the time ($T_2$) that a paper reaches the timing rollers from the start position. In the upper chart, the print engine 4 is started when the data to be printed exists and a paper is fed in advance to the timing rollers. Therefore, the printing ends earlier by a time difference shown in FIG. 12. It can be displayed in the operational panel 44 that the printer is selected.

In the lower chart in FIG. 12, a paper is not fed in advance so that a paper stops at the timing rollers during a time Z and an unnecessary wait time happens. Such processes happens in a prior-art printer or when the next paper is fed after the paper-feed in advance is forbidden.

FIG. 13 shows the timing of the image-forming process unit of the electrophotographic unit 45. As shown in the upper part (a), if the timer T ends before the data transformation is completed, parts of the image-forming process unit (for example, the main motor, the main charger and the development bias voltage) are turned off successively. After the data transformation is completed, the parts are turned on again successively. If the data transformation is completed before the time T ends, the parts are kept to be turned on as shown in the lower part (b).

The timing control is mentioned above with respect to the transformation time of the received data to intermediate codes and to the drawing time in the bit-map writer 31. Furthremore, the timing control is also effective when the transmission time from the data processor 1 and the file buffer 2 is long.

In the present invention, the control of paper feed in advance is done automatically by taking preference to the throughput. If a switch means for selecting whether the control of paper feed in advance is adopted or not is provided, the control of paper feed in advance can be selected so as not to be used in the graphic processing with preference to the drawing processing.

The interface controller 40 also controls the communication in the print engine 4. However, the detailed explanation will be omitted because the communication control is not related directly to the present invention.

(f) The control of electrophotographic process

Figure 14A:
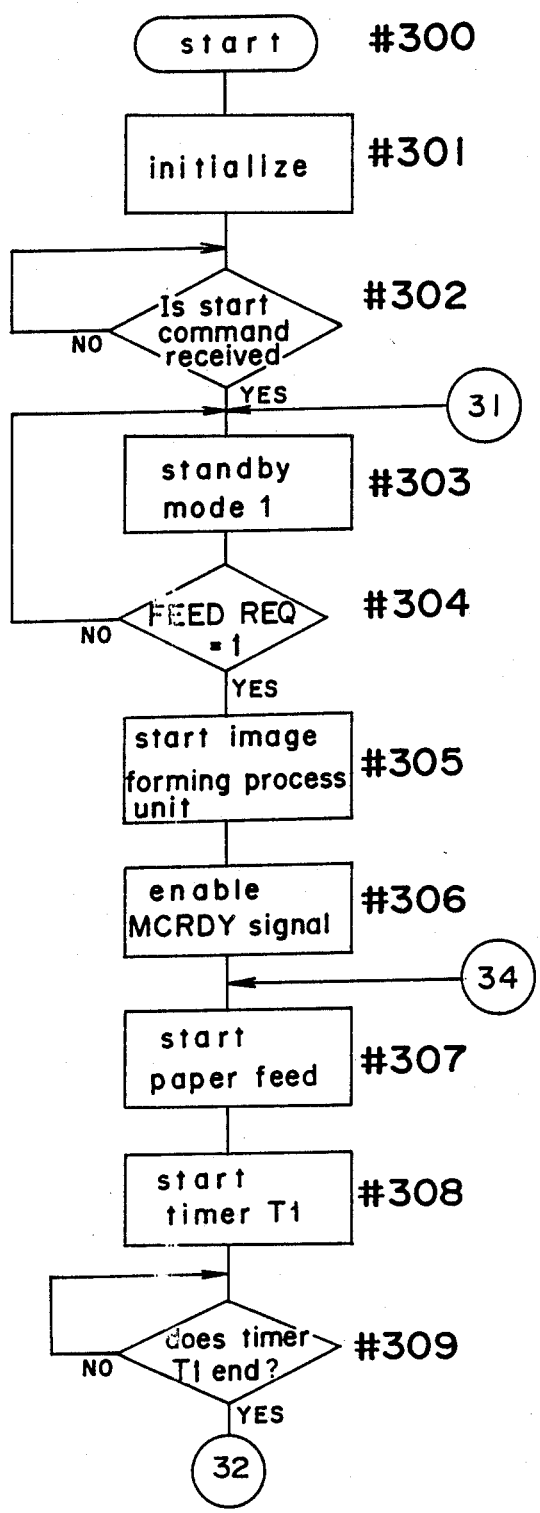
FIG. 14(A) and (B) are a flowchart of the processing of an electrophotographic controller.
Figure 14B:
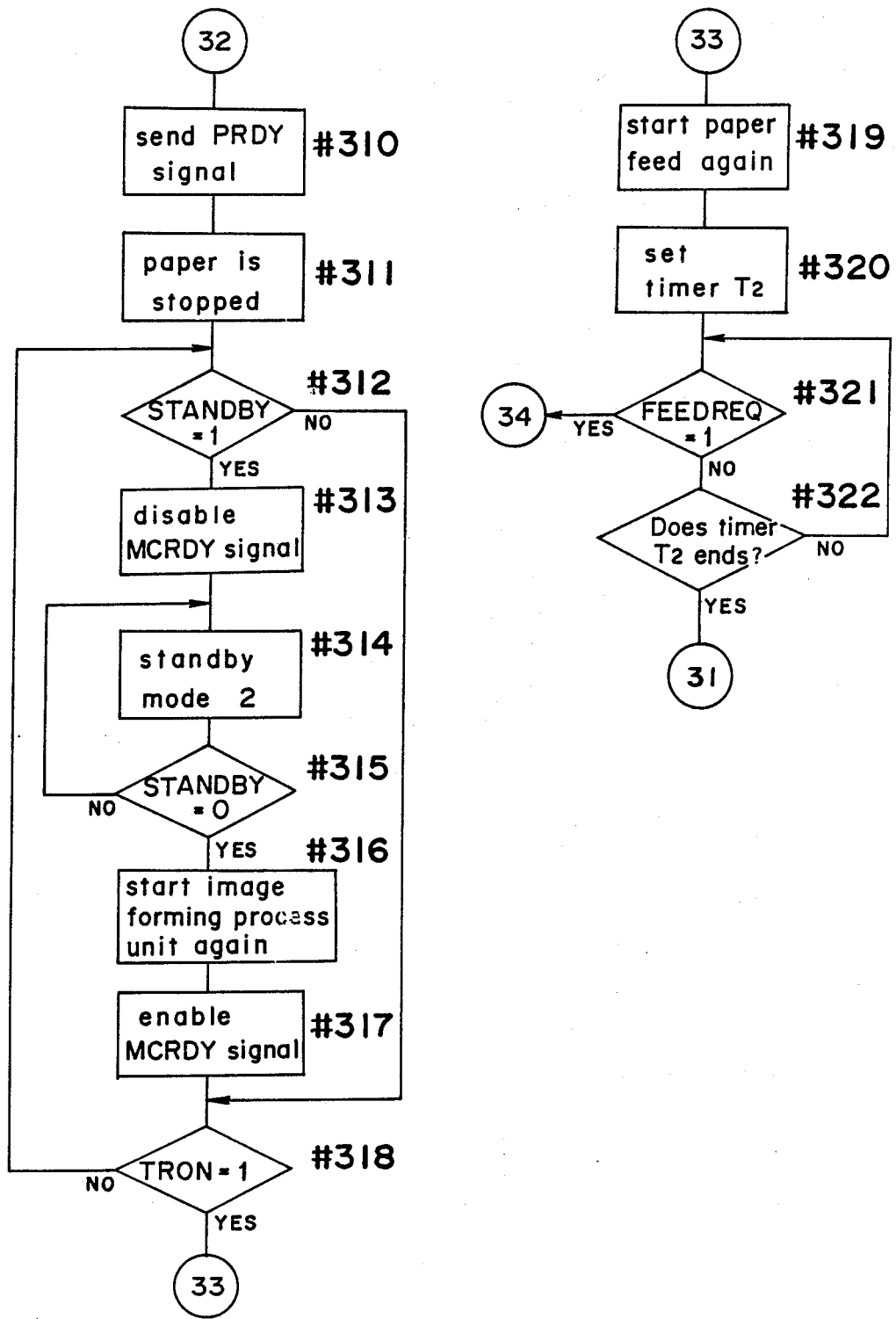

FIG. 14 shows a flow of the electrophotographic controller 41. When the electric power source of the print engine 4 is turned on (step #300), the electrophotographic controller 41 is initialized (step #301). Then, a start command (refer step #202) is waited until it is sent from the interface controller 40 (step #302).

If the start command is received (step #302), the print engine 4 is set to be in the standby mode 1, wherein the main motor and the photoconductor drum do not rotate while the temperature control of the fixer and the cooling fan are turned on (step #303). The standby mode 1 continues till a command PFCMD (refer step #114) is received from the interface controller 40 and a FEEDREQ signal is sent to the electrophotographic controller 41.

If the FEEDREQ signal is received (step #304), the image-forming process unit is started for printing (step #305). Accordingly, the main motor for example is turned on. Then, a signal MCRDY which indicates the completion of the preparation of the interface controller 40 is enabled (step #306), and the paper feed starts (step #307).

The timer T1 is set (step #308) at the same time as the start of paper feed. After the timer T1 ends (step #309) and the paper reaches the standby position, a signal PRDY which indicates that the paper is prepared is sent to the print-head controller 42 (step #310), and the paper is stopped (step #311).

Usually, a print command PRNCMD is set readily from the bit-map controller 30 (refer step #119), and then a signal TRON for the resumption of the paper feed is sent from the print-head controller 42 (refer step #411). If the electrophotographic controller 41 detects the TRON signal (step #318), the paper is resumed to be fed from the position of the timing rollers (step #319) and an image on the photoconductor drum is transferred to the paper. then, the electrophotographic controller 41 sets another timer T2 (step #320). Then, a next FEEDREQ signal is received (step #321), the program returns to step #307, and a next paper-feed starts. If the FEEDREQ signal is not received till the end of the timer T2 (step #322), the program returns to step #303, and the print engine 4 becomes in the standby mode 1 again.

If the processing time in the bit-map controller 30 is long or the transmission time from the data processor 1 or the file buffer 2 is long, the TRON signal is not sent from the print-head controller 42 (or a print command is not sent from the bit-map controller 30 to the interface controller 40). Then, a STANDBY signal is sent from the interface controller 40 (refer step #209). If the electrophotographic controller 41 detects the STANDBY signal (step #312), an MCRDY signal sent to the interface controller 40 is disabled (step #313). Thus, the print engine 4 is brought into the standby mode 2, wherein all electrophotographic parts including the main motor stop and the paper waits at the standby position. This prevents the unnecessary lowering of the life of the printer. Then, the processing of the data transformation in the bit-map controller 30 is completed, and the interface controller 40 disables the STANDBY signal. If the electrophotographic controller 41 detects the STANDBY signal (step #315), the image-forming process unit resumed to turn on (step #316), and a MCRDY signal is sent to the interface controller 40 again (step #317).

(g) Control of print head

Figure 15:
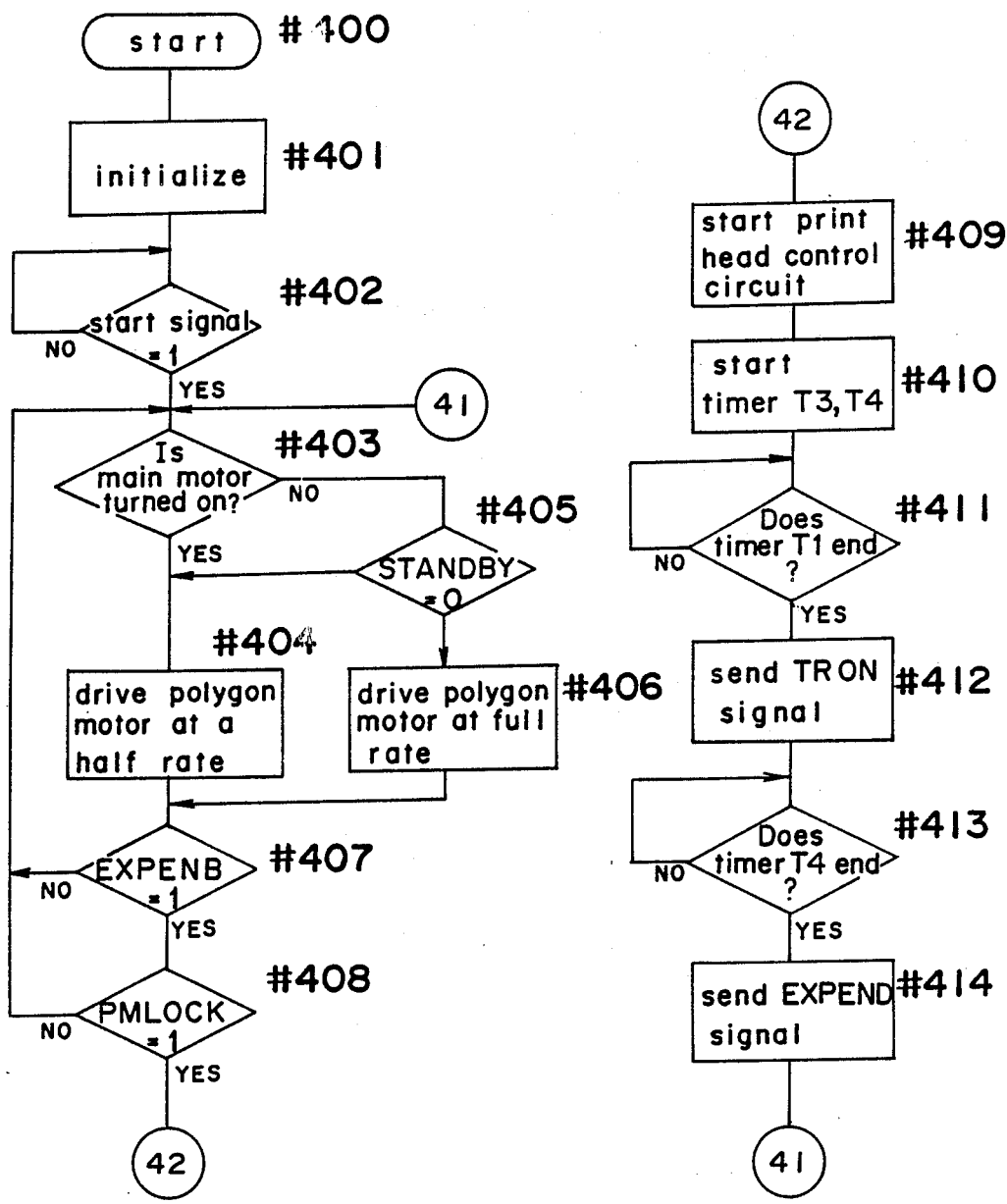
FIG. 15 is a flowchart of the processing of a print head controller.

FIG. 15 shows a flow of the print head controller 42. When the electric power source of the print engine 4 is turned on (step #400), the print-head controller 42 is initialized (step #401). Then, the print-head controller 42 waits for a start signal which is sent from the interface controller 40 (step #402, refer step #202).

When the start signal is received (step #402), a processing loop is started. First, the polygon motor 432 is rotated. If the main motor is turned on (step #403), the polygon motor is kept rotating at a normal rate of revolution number (step #404). If the main motor is not turned on, that is, if the electrophotographic controller 41 is in the standby mode 1 or in the standby mode 2 (NO in step #403), it is decided with the STANDBY flag whether the stop is due to an auto shut during a printing or due to the completion of a printing (step #405). In case of the stop due to the completion of a printing, the polygon motor 432 is rotated at a rate of about a half of the normal revolution rate in order to lengthen the life of the polygon motor 432 (step #406). On the other hand, in case of the stop during a printing, the print engine 4 will necessarily resume to start so that the polygon motor is kept to rotate at a full rate (step #404).

Then, the start of the printing is determined. The start of printing requires two conditions. First, a signal EXPENB which indicates the emission of the exposure of laser beam should be received from the interface controller 40 (step #407, refer #217). Second, a signal PMLOCK which indicates that the polygon motor 432 is rotating stably at the normal rate of revolution is received from the polygon motor driver 427. The polygon motor 432 is controlled by the same timing as the main motor (step #403).

If the two conditions are satisfied (YES in both step #407, 408), a start signal is sent to the print-head control circuit 426 so as to start the exposure (step #409). Then, the print-head control circuit 426 requests the transmission of data successively to the bit-map writer 31, and controls the emission of the semiconductor laser 431 according to the data received.

The print-head controller starts two timers T3 and T4 at the same time as the start of the exposure (step #410). The timer T3 is a fixed timer irrespective of the size of paper, and it is used to resume the feed of a paper at the standby position and to control the paper to stop at the standby position. If the timer T3 ends (step #411), a TRON signal is sent to the electrophotographic controller 41 (step #412). The timer T4 is used in order to synchronize with the bit-map controller 30, and it varies with the size of paper. If the timer T4 which indicates the end of the exposure ends (step #413), an EXPEND signal is sent to the interface controller 40 (step #414).

It can be distinguished by the beat of the polygon motor 432 whether the polygon motor 432 rotates at a half rate or at full rate in the standby mode. In a modified embodiment of the present invention, a sensor is provided which can detect the beat, and the beat can be used to decide whether the standby mode is during a printing or not, without using the STANDBY flag.

This invention may be practiced or embodied in still other ways without departing from the spirit or essential character thereof. The preferred embodiments described herein are therefore illustrative and not restrictive, the scope of the invention being indicated by the appended claims and all variations which come within the meaning of the claims are intended to be embraced therein.

What is claimed is:

1. A printer which makes use of an electrophotographic process, comprising:
   a communication means for receiving data to be printed;
   a first memory means for storing the data received by the communication means;
   a transformation means for reading out the data stored in the first memory means and for transforming the data read out from the first memory means into intermediate codes different from those of the received data;
   a second memory means for storing the intermediate codes transformed by the transformation means;
   an output control means for reading the intermediate codes from the second memory means and for sending output signals for exposure of a photoconductor of the printer according to said intermediate code;
   a print means for printing an image formed on the photoconductor on a paper having been fed thereto;
   a feed means for feeding a paper to the printer means through a predetermined stop position near the print means, and
   a feed control means for making the feed means feed a paper to said predetermined stop position in advance after the received data, in the amount of a predetermined unit of a page of printing, is started to be transformed into the intermediate codes but before the completion of the transformation and for making the feed means feed the paper from the predetermined position to the print means when the data transformation has been completed.

2. A printer as claimed in claim 1 wherein the feed control means determines whether or not the paper, for printing the next page, is to be fed in advance in accordance with a predetermined time period needed for the transformation of the data of the preceding page.

3. A printer which makes use of an electrophotographic process, comprising:
   a communication means for receiving data to be printed;
   a first memory means for storing the data received by the communication means;
   a transformation means for reading out the data stored in the first memory means and for transforming the data read out from the first memory means into intermediate codes different from those of the received data;
   a second memory means for storing the intermediate codes transformed by the transformation means;
   an output control means for reading the intermediate codes from the second memory means and for sending output signals for exposure of a photoconductor of the printer according to said intermediate code;
   a print means for printing an image formed on the photoconductor on a paper having been fed thereto;
   a feed means for feeding a paper to the print means;
   a timer means for sending a signal when the time of the transformation by the transformation means exceeds a predetermined time, the sending of said signal being independent of the reception of data by the communication means, and
   a print control means for making the print means being into a standby mode when said signal is received from the timer means.

4. A printer which makes use of an electrophotographic process, comprising:
   a communication means for receiving data to be printed;
   a transformation means for transforming the data received by the communication means into intermediate codes different from those of the data;
   a memory means for storing the intermediate codes transformed by the transformation means;
   an output control means for reading codes from the memory means and for sending output signals for exposure of a photoconductor of the printer according to said intermediate codes;
   a print means for printing an image formed on the photoconductor on a paper having been fed thereto;
   a feed means for feeding a paper to the print means;
   a feed control means for enabling the feed means to feed a paper to a predetermined stop position near the print means in advance after the transformation of the one-page data into intermediate codes has been started and for making the feed means feed the paper from said stop position to the print means;
   a timer means for sending a signal when the time of the transformation by the transformation means exceeds a predetermined time, the sending of said signal being independent of the reception of data by the communication means, and
   a print control means for controlling the print means so as to bring it into a standby mode and controlling the feed control means and the timer means in such a relation as to prohibit feeding of the next paper to the stop position when said signal is received from the timer means.

5. A printer which makes use of an electrophotographic process, comprising:
- a communication means for receiving data to be printed;
- a transformation means for transforming the data received by the communication means into intermediate codes different from those of the data;
- a memory means for storing the intermediate codes transformed by the transformation means;
- an output control means for reading codes from the memory means and for sending output signals for exposure of a photoconductor of the printer according to said intermediate codes;
- a print means for printing the latent electrostatic image formed on the photoconductor on the paper having been fed thereto;
- a feed means for feeding a paper to the print means;
- a feed control means for enabling the feed means feed a paper to a predetermined stop position near the print means in advance after the transformation of the one-page data into intermediate codes has been started;
- a decision means for deciding whether the print means should be brought into a standby mode or not according to predetermined conditions independent of the reception of data by the communication means after the print means has been once started to operate, and
- a print control means for controlling the print means so as to bring it into the standby mode and for controlling predetermined constituent parts of the printer so as not to bring those predetermined constituent parts of the print means, which need a long warm-up time on the resumption of printing into the standby mode of operation when it is decided that the print means should be brought into the standby mode.

6. A printer which makes use of an electrophotographic process, comprising:
- a communication means for receiving data to be printed;
- a first memory means for storing the data received by the communication means;
- a transformation means for reading out the data stored in the first memory means and for transforming the data read out from the first memory means into intermediate codes different from those of the received data;
- a second memory means for storing the intermediate codes transformed by the transformation means;
- an exposure means for exposing a photoconductor of the printer according to said intermediate codes from the second memory means so as to form an image corresponding to said intermediate codes;
- a print means for printing an image formed on the photoconductor on a paper having been fed thereto;
- a signal generating means for generating a signal to activate the print means when the second memory means starts to store the intermediate codes transformed by the transformation means, and
- a print control means for causing the print means to be brought into a preparatory operation when the activating signal is generated from the signal generating means, and for causing the print means to be brought into an actual print operation when the data transformation is completed.

7. A printer as claimed in claim 6, wherein the preparatory operation includes feeding of the paper toward the photoconductor.

8. A printer as claimed in claim 6, wherein the preparatory operation includes the start of movement of the photoconductor.

9. A printer comprising:
- a memory means for transforming an exterior information concerning an image to be printed into an image data and for causing the image data to store in a memory;
- a light beam generating means for generating a light beam to expose a photoconductor;
- a printing means for making an image formed on the photoconductor into a visible image on a paper;
- a first control means for controlling the light beam generating means to be turned on and off according to the image data stored in the memory;
- a second control means for controlling the printing means, and
- a third control means for controlling the first and second control means by receiving status signals from the first and second control means and transmitting instruction signals to the first and second control means,
- wherein the first control means directly communicates with the memory to receive the image data when the third control means generates an instruction signal for allowing the exposure by the light beam generating means.

10. A printer as claimed in claim 9, wherein the first control means includes a microprocessor with a bus through which the image data is transmitted.

11. A printer comprising:
- a memory means for transforming an exterior information concerning an image to be printed into an image data and for causing the image data to store in a memory;
- a light beam generating means for generating a light beam to expose a photoconductor;
- a printing means for making an image formed on the photoconductor into a visible image on a paper;
- a first control means for controlling the light beam generating means according to the image data stored in a memory;
- a second control means for controlling the printing means, and
- a third control means for controlling the first and second control means by receiving status signals from the first and second control means and transmitting instruction signals to the first and second control means,
- wherein the third control means generates instruction signals to the first and second control means to activate them when the printer is powered on, and thereby to control the first and second control means.

12. A printer as claimed in claim 11, wherein the printing means has a paper feed means for feeding a paper to the photoconductor through a predetermined stop position, and the third control means, when enabled, sets itself in an enabling state in which the third control means is able to generate an instruction signal for instructing the second control means to feed the paper to the stop position when the communication means receives the information.

13. An improved electrophotographic printer having a source of light that can be controlled to record an image on a photoconductive surface, comprising:
   means for receiving data on the images to be printed;
   means for operating upon and storing the data in a format that can control a source of light;
   print control means for exposing the photoconductive surface in accordance with the stored data, and
   means for supplying copy paper to the photoconductive surface including a timer means for setting a predetermined time period for operating upon the receiving data to store it in a format compatible with the print control means and for forwarding copy paper to a stationary predetermined position adjacent the photoconductive surface prior to the expiration of the predetermined time whereby the printing speed of the printer can be increased.

14. The invention of claim 13 further including photocopying elements that cooperate with the photoconductive surface to perform the electrophotographic process, and means for placing certain photocopying elements in an enable state after the termination of the predetermined time period.

15. A printer comprising:
   a communication means for receiving data concerning image formation;
   a transformation means for transforming the data received by the communication means into intermediate codes different from those of the data;
   a memory for storing the intermediate codes transformed by the transformation means;
   a print means for making an image into a visible image on a paper in accordance with the intermediate codes, and
   a control means for controlling the transformation means, irrespective of the operation of the print means, so as to conduct the transformation from the data to the intermediate codes and to store the intermediate codes into the memory as long as the memory has space capable of storing the codes.

16. A printer as claimed in claim 15, wherein the print means includes a bit map memory into which a bit image to be read for printing is written according to the intermediate codes, and the control means causes the transformation means to conduct the data transformation and to store the codes into the bit map memory irrespective of any writing and the reading operation therefrom.

17. A printer which makes use of an electrophotographic process, comprising:
   a communication means for receiving data to be printed;
   a first memory means for storing the data received by the communication means;
   a transformation means for reading out the data stored in the first memory means and for transforming the data read out from the first memory means into intermediate codes different from those of the received data;
   a second memory means for storing the intermediate codes transformed by the transformation means;
   an output control means for reading the intermediate codes from the second memory means and for sending output signals for exposure of a photoconductor of the printer according to said intermediate code;
   a print means for printing an image formed on the photoconductor on a paper having been fed thereto;
   a feed means for feeding a paper to the printer means through a predetermined stop position near the print means, and
   a feed control means for making the feed means feed a paper to said predetermined stop position in advance after the received data, in the amount of a predetermined unit of a page of printing, is started to be transformed into the intermediate codes but before the completion of the transformation and for making the feed means feed the paper from the predetermined position to the print means when the data transformation has been completed, wherein the feed control means controls the feed means so as to feed the next paper after the exposure of the photoconductor according to the intermediate codes in a unit of a predetermined page when a plurality of prints of the same page is designated.

18. An improved electrophotographic printer having a source of light that can be controlled to record an image on a photoconductive surface, comprising:
   means for receiving data on the images to be printed;
   means for operating upon and storing the data in a format that can control a source of light;
   print control means for exposing the photoconductive surface in accordance with the stored data, and
   means for supplying copy paper to the photoconductive surface including a timer means for setting a predetermined time period for operating upon the receiving data to store it in a format compatible with the print control means and for forwarding copy paper to a stationary predetermined position adjacent the photoconductive surface prior to the expiration of the predetermined time whereby the printing speed of the printer can be increased, wherein the source of light further includes a rotating polygon and a motor to rotate it and means for driving the motor at a first speed for printing and at a second lower speed for idling.

* * * * *